Sept. 6, 1966  H. J. DISBROW ETAL  3,271,023
SHEET COLLATING APPARATUS
Filed Dec. 30, 1963  4 Sheets-Sheet 1
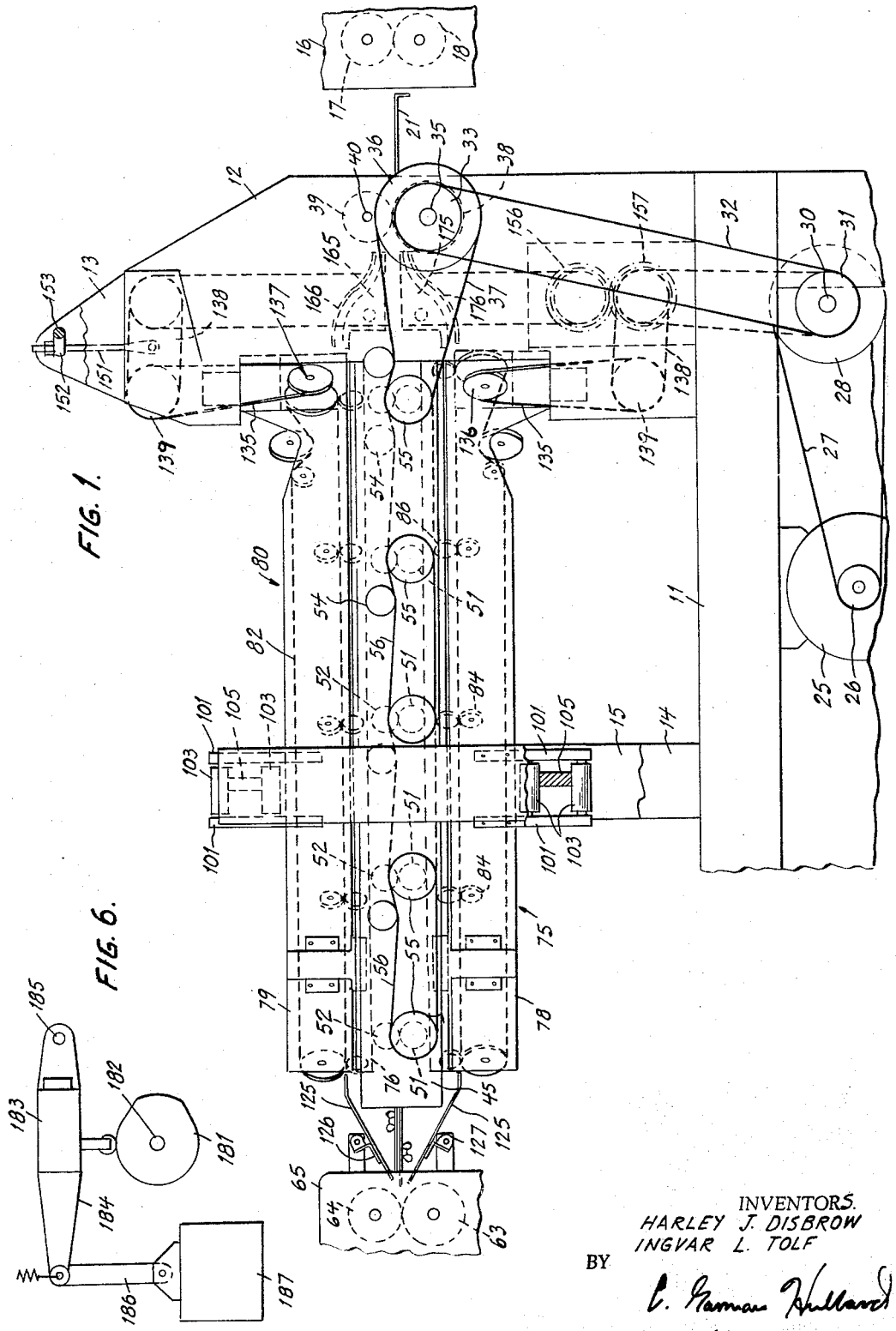
INVENTORS.
HARLEY J. DISBROW
INGVAR L. TOLF
BY
ATTORNEY

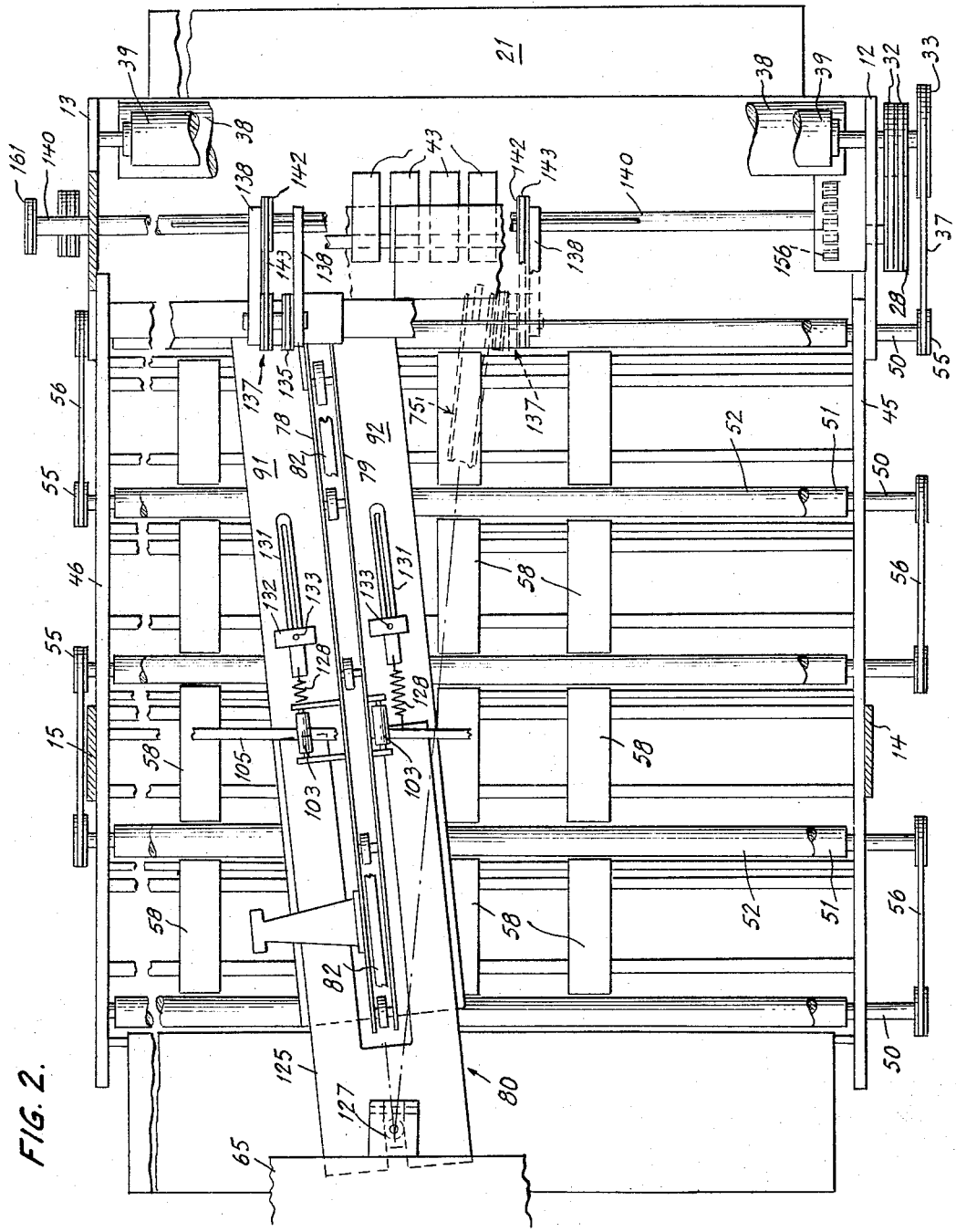

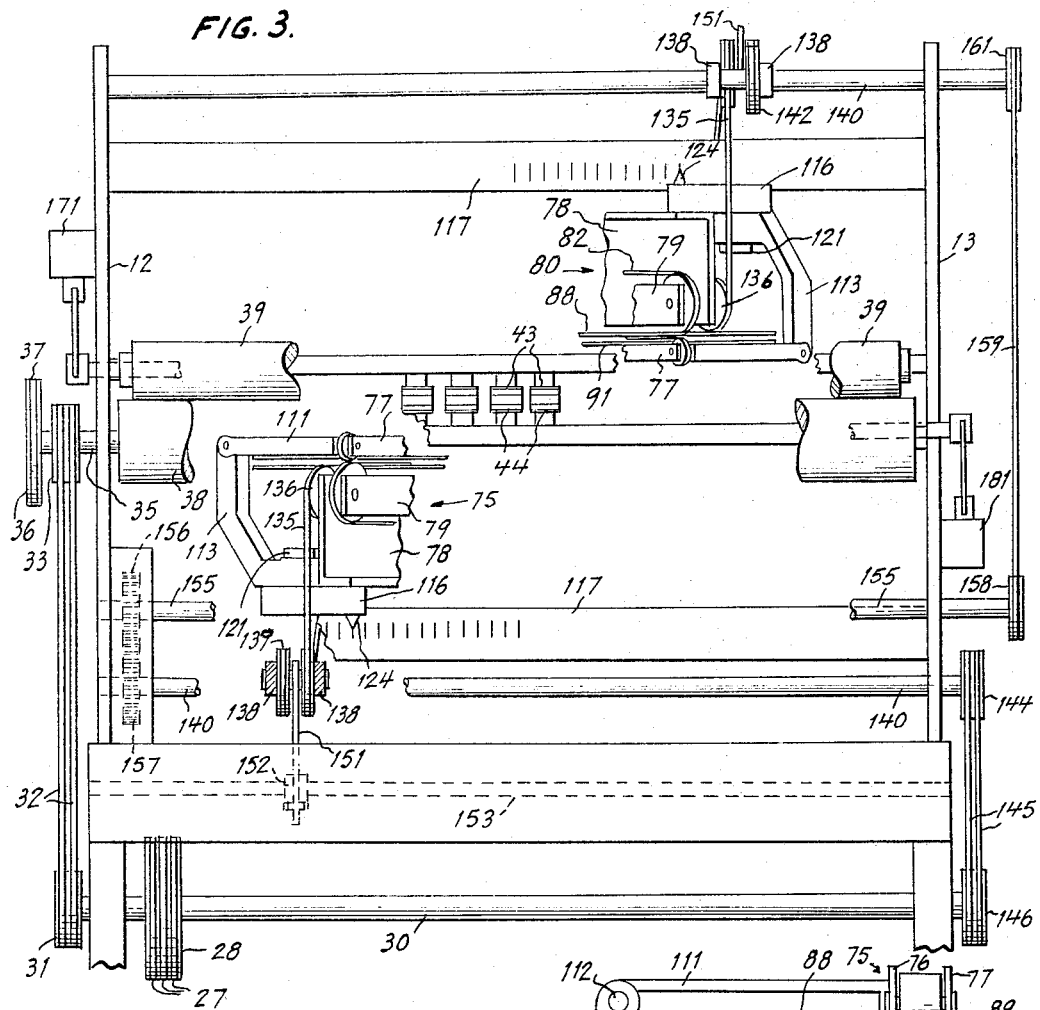
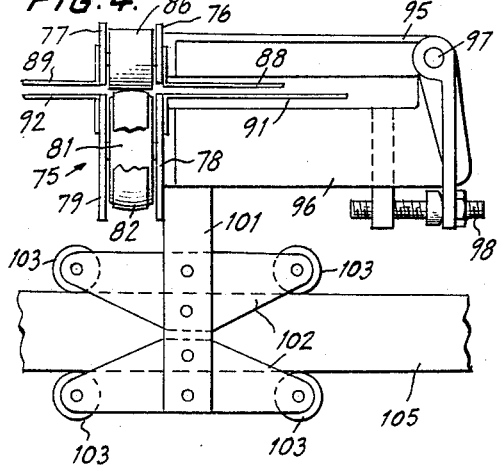
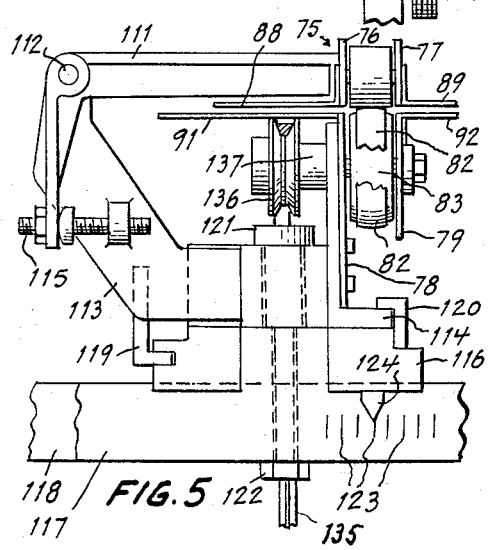

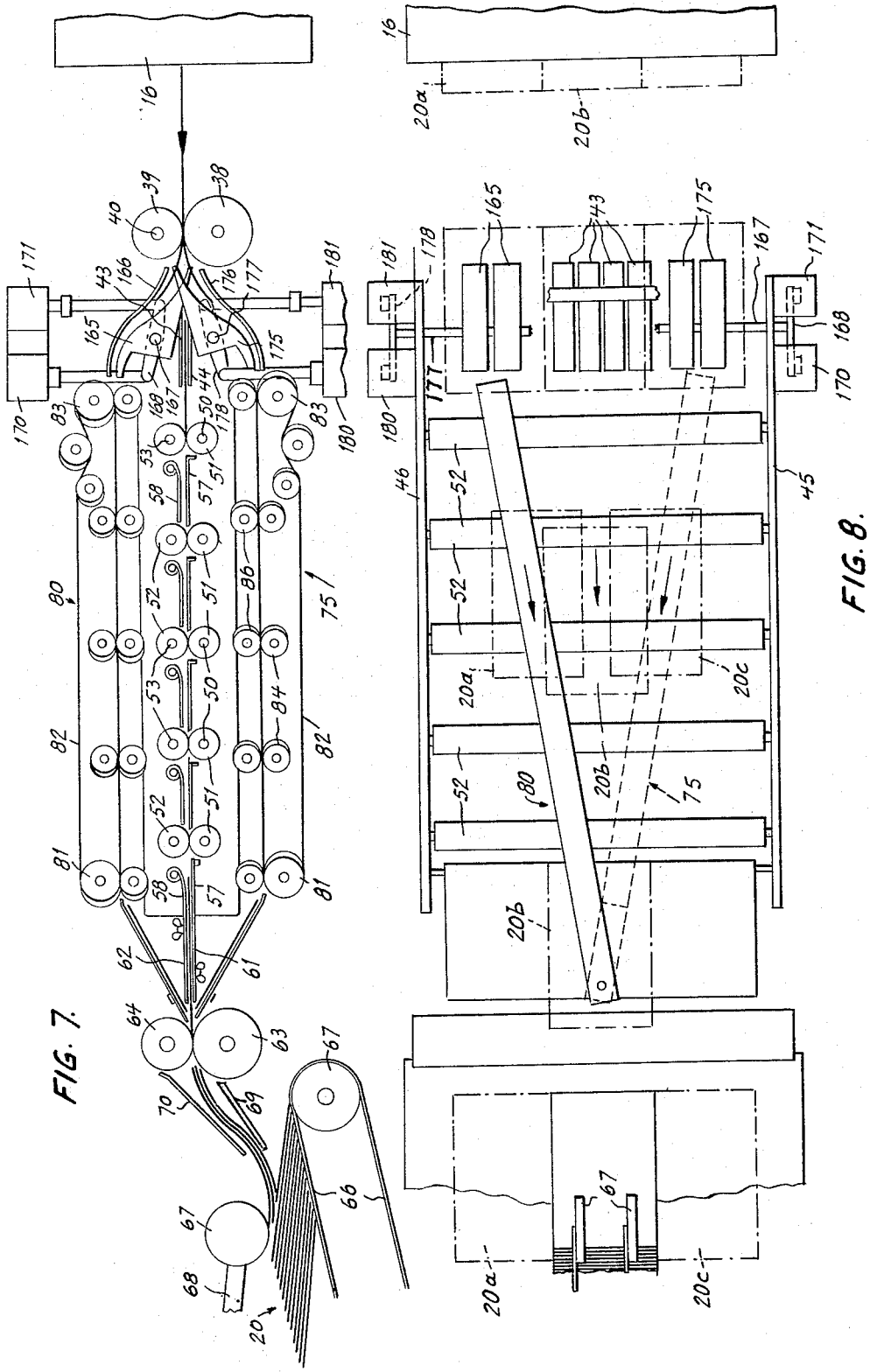

3,271,023
SHEET COLLATING APPARATUS
Harley J. Disbrow, Richland, and Ingvar L. Tolf, Battle Creek, Mich., assignors to General Foods Corporation, White Plains, N.Y., a corporation of Delaware
Filed Dec. 30, 1963, Ser. No. 334,230
16 Claims. (Cl. 270—58)

This invention relates generally to apparatus for collating articles of sheetlike material and has particular reference to mechanism adapted to receive said articles when arranged in two or more separate files feeding abreast of each other and to merge said separate files into a single file or, alternatively, to deliver the articles in corresponding separate and distinct piles.

The invention is shown in an embodiment adapted for receiving carton blanks, formed of paperboard or the like and arranged in three separate side-by-side files, and merging the two outer files of articles with the articles in the center file to facilitate further processing of the carton blanks if all the blanks, upon inspection thereof, are free of defects or, alternatively, for depositing the articles in one or the other, or both, of the outer files in offset relation to the articles in the center file in instances where the articles arranged in the outer files may not meet inspection standards. The apparatus is designed to be disposed at the discharge end of an automatic cutting press which, in the present instance, stamps out carton blanks from web or sheet material into three coplanar, parallel and abutting files of carton blanks. The apparatus includes a conveyor system which includes a center conveyor for the center file of carton blanks and an upper and lower conveyor for the two outer files of carton blanks, respectively. Said supper and lower conveyors operate to feed the associated carton blanks obliquely relative to the center conveyor along respective directional axes which converge so that when the carton blanks reach the discharge end of the collating apparatus the three files become merged in superimposed relation with the center file, whereupon they are deposited on a further conveyor from which they may be easily removed for further handling. The term "directional axis" as herein employed designates the direction of travel as represented by the course bearings of the feed path, or a projection thereof, traversed by the articles fed by a respective conveyor within the respective feeding plane and all other planes parallel thereto.

Experience with equipment of this sort has shown that when defects occur in the forming of the carton blank, the same defect will most likely exist in a successive series of carton blanks comprising one or the other files with the result that rejection of said defective cartons has required the manual culling of the merged files and picking out, for example, every third carton blank until all of the defective blanks have been thus rejected. This culling operation is obviously a time-consuming, uneconomical method of rejecting the defective carton blanks.

The machine of the present invention is provided with a deflector mechanism which may be controlled by an operator so that instead of causing the outer files to merge with the center file, either one or both of the outer files may be caused to by-pass the respective upper or lower conveyor and feed in parallel relation with the center file so as to be discharged from the apparatus in a laterally offset relation to the blanks fed by the center file. In this manner, when a defect is found in a blank fed by either of the upper or lower conveyors, the operator may cause the associated file to be deposited in the aforesaid offset relation so as to permit rejection thereof without the laborious and time-consuming culling operation heretofore required.

The upper and lower conveyors of the instant apparatus are adjustably positionable so as to accommodate blanks of varying size. The adjustability means includes a construction which allows for varying width of the carton blanks as well as for varying length of the carton blanks.

It is, therefore, an object of this invention to enable the selective merging or nonmerging of a plurality of files of sheetlike members being fed in coplanar and parallel relation with one another.

It is a further object of this invention to provide separate conveyors for each of a plurality of coplanar, parallel feeding sheetlike members which may be adjusted in their positions relative to one another to accommodate articles of varying size.

It is a further object of this invention to provide a collating apparatus for sheetlike articles of the character described and being reliable in operation, simplified in design and economical to manufacture.

Further objects of this invention, together with the features contributing thereto and the advantages accruing therefrom, will be apparent from the following description when read in conjunction with the drawing wherein:

FIG. 1 is a side elevation of the apparatus;
FIG. 2 is a plan view of the apparatus;
FIG. 3 is an elevational view of the input end of the apparatus;
FIG. 4 is a detail view of the means for supporting the discharge end of one of the adjustably positionable conveyors;
FIG. 5 is a detail view of the means for supporting the input end of one of said adjustably positionable conveyors;
FIG. 6 is a detail view of means for synchronizing the operation mechanism;
FIG. 7 is a schematic showing of the apparatus in side elevation;
FIG. 8 is a schematic showing of the apparatus in plan.

With reference now to FIG. 1 in particular, it will be seen that the apparatus includes a framework, including a base platform 11 to which is suitably secured a pair of upright frame plates 12, 13 disposed at the input end of the apparatus, see FIG. 3, and another pair of upright side frame plates 14, 15 disposed toward the output end of the apparatus, it being understood that the feeding direction proceeds from right to left as viewed in FIGS. 1 and 2. The apparatus is disposed with its input end in proximity to the stripping section of a cutting press 16, which includes a pair of discharge rolls 17, 18 by which flat carton blanks 20a, 20b, 20c, see FIG. 8, in three rows or files, respectively, abreast of each other are advanced into the input end of the collating apparatus. A transfer shelf 21 secured to the upright frame plates 12, 13 serves to direct the blanks into the collating apparatus.

Suitably supported below the platform 11 is a motor 25 which serves as the source of driving power for the apparatus, the output shaft of which carries a pulley 26 around which run triple belts 27 running to a triple pulley 28 mounted on a shaft 30 near one end thereof. Shaft 30 is suitably journaled in the side frame plates 12, 13 and carries at its extreme outer end a double pulley 31 around which runs a double belt 32 running to a double pulley 33 mounted on a shaft 35 near one end thereof.

The shaft 35 is suitably journaled in the frame plates 12, 13 and carries at its extreme end a pulley 36 around which is wrapped a belt 37 for driving the center conveyor of the apparatus as will be hereinafter described. The shaft 35 also carries a roll 38 which in cooperation with a roll 39 mounted on a shaft 40, also journaled in the side frame plates 12, 13, serve as the input feed rolls for the apparatus.

Disposed beyond the feed rolls 39 and in line with the feed path for only the center file of carton blanks 20b are a plurality of guide strips 43, 44 arranged in opposed pairs and presenting converging guide surfaces for directing carton blanks to the center feed conveyor now to be described.

Said center feed conveyor includes a pair of side frame plates 45, 46. Said frame plates extend longitudinally in the direction of feed and are supported at the input end of the apparatus by the side frame plates 12, 13 and near the output end of the apparatus by the side frame plates 14, 15, respectively. Journaled in said frame plates 45 are a series of transverse shafts 50, each of which carries a feed roll 51 cooperating with a paired feed roll 52 carried by transverse shafts 53 also suitably journaled in the side frame plates 45, 46. Mounted on each end of the shafts 50 is a pulley 55 which pulleys are coupled in pairs by driving belts 56, the arrangement being such that the driving torque is applied to each shaft at one end thereof and is transferred to the next shaft of the series from the opposite end thereof by means of the alternate side disposition of the drive belts 56. The driving force is imparted to the first shaft 50 of the series by means of the belt 37 which wraps around a pulley 55 on one end of the said first shaft 50. A tensioning roller 54 takes up the slack in each belt 56. It should be noted, as can be seen in FIGS. 2 and 8, that the paired feed rolls 51, 52 extend across the entire width of the machine between the side frames 45, 46 so as to enable the center conveyor to feed all three files of carton blanks 20a, 20b, 20c, depending upon the setting of certain deflector control mechanism hereinafter to be described, if such mode of operation should be desired. Between these several pairs of feed rolls 51, 52 are disposed suitable guide members 57, 58 for directing the blanks from the nip of one pair of rolls into the nip of the next pair of the series.

Beyond the last pair of feed rolls 51, 52 at the discharge end of the apparatus is an adjustable guide mechanism comprised of guide plates 61, 62 disposed in overlapping relationship to the associated guide members 57, 58 respectively. The lower and upper plates 61, 62 are held in an adjusted position relative to members 57, 58 by any appropriate means such as wing nuts or the like, the arrangement enabling the guides to be extended or retracted to suit the length of the carton blanks being fed, the guide mechanism serving to direct the carton blanks discharged from the apparatus into the nip of feed rolls 63, 64 forming part of a slow belt stacking assembly 65. The stacking assembly or apparatus includes a slow moving belt 66, see FIG. 7, wrapped around a wide pulley 67 and adapted to receive the carton blanks and convey them for further processing, the carton blanks being retained in stacked arrangement on the belt 66 by a pair of retaining rollers 67 each supported at the end of a downwardly biased arm 68. Suitable guides 69, 70 direct the carton blanks from the feed rolls 63, 64 to the stacking belt 66.

The conveying mechanism for feeding the two outer files of carton blanks, i.e., those containing blanks 20a and 20c, comprise separate assemblies 75, 80 one of which is disposed above the center conveyor just described and the other of which is disposed below the center conveyor. The lower conveyor 75 is adapted for feeding the file of carton blanks 20c and represents an assembly which includes an overlying pair of spaced-apart frame plates 76, 77 and an underlying pair of spaced frame plates 78, 79, see FIG. 4. The lower conveyor 75 is similar in construction to the upper conveyor 80 so that the same reference numerals will be employer on the corresponding parts thereof, the conveyors being mounted in an inverted relationship to one another and in mirror relationship to the center conveyor heretofore described. FIGS. 4 and 5 show details of the mounting assemblies for the lower conveyor 75, it being understood that similar assemblies are provided for the upper conveyor 80, not shown in the same detail herein but which would appear in inverted relationship to the structure shown in FIGS. 4 and 5.

Rotatably supported between the frame plates 78, 79 of the conveyor 75, see FIG. 4, is a pulley 81 around which is wrapped a feed belt 82 which runs to the input end of the conveyor and wraps around a pulley 83, see FIG. 5. Also mounted between the frame plates 78, 79 and disposed at spaced intervals along the feeding reach of the belt 82 are a series of support rollers 84 which hold the feeding reach of the belt in a substantially horizontal plane. Cooperating with each of the rollers 84 and the pulleys 81, 83 is a pressure roller 86 supported by and between the frame plates 76, 77, each pressure roller being mounted on a pivotal arm 87 spring-biased to urge its associated roller into pressure contact with the belt 82 at its point of tangency with the pulleys 81, 83 and the support rollers 84. The file of cartons 20c are thus fed by the belt 82 in cooperation with the pressure rollers 86. Guide plates 88, 89 secured to the frame members 76, 77, respectively, and guide plates 91, 92, secured to the frame members 78, 79, serve to define a feed passage substantially coextensive with the width of the carton blanks for directing the blanks through the conveyor system.

The feed belt assembly and the pressure roller assembly are supported in adjustable relation to each other by adjustable mechanism disposed at opposite ends of the conveyor and best seen in FIGS. 4 and 5. Near the output end of the conveyor, see FIG. 4, the assemblies are supported by mechanism which includes a support bell crank 95 and a support arm 96 to which the bell crank is pivoted at 97. The arm 96 is secured at one end thereof to the frame plate 78 of the belt assembly and the end of the horizontal arm of bell crank 95 is secured to the frame plate 76 of the pressure roll assembly. The vertical arm of bell crank 95 carries an adjusting screw 98 threaded into a flange formed in the support arm 96 whereby the vertical spacing between the pressure roller assembly and the drive belt assembly may be adjusted as desired, depending upon the thickness of the carton blanks being conveyed. The entire assembly is supported by vertical bars 101, see also FIG. 1, to which are secured a carriage comprising plates 102 mounting rollers 103 in an arrangement wherein they straddle a frame bar 105 of the apparatus, said bar 105 being suitably supported at its ends by the upright frame plates 14, 15. It will be noted that the rollers 103 are substantially wider than the width of the bar 105 which enables the conveyor 75 to be adjustably positioned relative to the central conveyor over an arcuate range and about an axis located at the discharge or output end of the conveyor, the adjustability providing for varying the angle of convergence between the directional axes of conveyor 75 and the central conveyor heretofore described as required for carton blanks of varying width.

The input end of conveyor 75 is similarly mounted for adjustability by mechanism which includes a bell crank 111, see FIG. 5, pivotally secured at 112 to an angular support arm 113. One end of the horizontal arm of bell crank 111 is secured to frame plate 76 of the pressure roller assembly, and the angular arm 113 is secured integral with the feed belt assembly by means of a bracket 114 joined to the arm and to the frame plate 78. The depending or vertical arm of the ball crank 111 carries an adjusting screw 115 threaded into an extrusion formed on the arm 113 so as to enable adjustment in the spacing between the pressure roller assembly and the feed belt assembly in a manner similar to that previously described for supporting the output end of the conveyor. The angular arm 113 is supported for rotative adjustment relative to a carriage 116 in the form of a block milled out on its bottom surface to slidably fit over a pair of frame bars 117, 118 which are spaced apart and are secured at their ends in the upright frame plates 12, 13. Both the angular bar 113 and the block 116 are formed with a vertical bore for receiving a shouldered bolt 121 serving as a bearing and which extends also between the frame bars 117, 118 and carries a clamping nut 122 at its lower end. The assembly is stabilized by angular fingers 119, 120, the former being secured to arm 113 and fitting in a slot in block 116, the latter being secured to block 116 and overlying the foot of bracket 114. The arrangement enables the support assembly to be slid laterally along the frame bars 117, 118 when the clamping nut 122 is loosened so as to vary the angle of convergence of the conveyor with the center conveyor to accommodate cartons of varying width. To facilitate the desired adjustment, a graduated indicator scale 123 is marked on the frame bar 117 which cooperates with a pointer 124 attached to the carriage or block 116.

In order to allow for variation in the effective length of the conveyor resulting from different angular positions thereof, adjustable guide mechanism is provided which can best be seen by reference to the upper conveyor 80 as shown in FIG. 2. The adjustable means comprises a bifurcated guide plate 125 which projects beyond the limit of the feed belt and is bent at its projecting end so as to direct the carton blanks into the feeding plane of the center conveyor. Said extending portion of the guide 125 carries a coupling 126 pivotally joining it with a clamping device 127 secured to the frame of the slow belt assembly 65, said coupling providing the axis about which the conveyor is adjustably positioned. The opposite bifurcated ends of the guide 125 are maintained by a suitable means in overlapping relationship to the fixed guides 91, 92 and carry at their extremities a spring 128 each connecting with a slotted link 131 fitted in a link guide 132 carrying a clamping screw 133 embraced within the slot of the link 131. By this arrangement, the relative spacing between the collating apparatus and the slow belt assembly 65 can be altered while still maintaining the guide 125 in fixed relation to the slow belt assembly due to the yield of the springs 128 and the slot and screw coupling just described, the same construction allowing for varying the effective length of the conveyor due to changes in the angle of convergence of the conveyor with the central conveyor, even though the spacing between the collator apparatus and the slow belt assembly is unchanged.

The drive for conveyor 75 is transmitted through a belt 135 which wraps around a pulley 136, best seen in FIG. 5, mounted on a stud shaft 137 in common with the pulley 83, heretofore described. The belt 135 runs to a double pulley 139 carried by and between a pair of support arms 138, the other ends of said arms 138 being loosely mounted on a sleeve 141 keyed to a shaft 140. Mounted fast on the sleeve 141 is a pulley 142 about which is wrapped a belt 143 which wraps around and drives the double pulley 139. Shaft 140 extended laterally across the machine is journaled in the frame plates 12, 13, as can best be seen in FIG. 3, the shaft at one end thereof carrying a double pulley 144 coupled through double belts 145 with a double pulley 146 carried on the end of shaft 30. Through the drive train just described the motor is effective for driving the lower conveyor 75. A tensioning device is provided for adjusting the tension in belt 135, said device including a link or rod 151 pivotally joined to support arms 138 and extending through a clamp 152 carried by a cross shaft 153, the end of the rod being suitably threaded and fitted with a nut whereby adjustment of the tension in the belt 135 may be effected. It will of course be understood that the above-described parts associated with the lower conveyor 75 are duplicated in the upper conveyor 80 but in inverted relation with the angle of convergence between the upper conveyor and the center conveyor being on the opposite side of the center line of the center conveyor as is the lower conveyor 75. The means for driving the upper conveyor 80 include a drive shaft 155 journaled in the side frame plates 12, 13 and carrying near one end a gear 156 meshing with a gear 157 on shaft 140. At its opposite end shaft 155 carries a pulley 158 around which is wrapped a belt 159 running to a pulley 161 carried on the end of the shaft 140 associated with the upper conveyor 80.

In order to guide the outer files of carton blanks containing the blanks 20a, 20c, respectively, into the upper conveyor 80 and the lower conveyor 75, respectively, for collating operations, controllable deflecting mechanism is provided which includes a series of deflectors 165 arranged in alignment with the file of carton blanks 20a, one of which deflectors is shown in FIGS. 1 and 7. Said deflectors cooperate with a fixed guide 166, so that when in rotated position they define a feed path from the nip of feed rolls 38, 39 to the input point for the upper conveyor 80. The deflectors 165 are mounted on a rock shaft 167 extending between the side frame plates of the machine, which shaft also carries a lever 168, the opposite ends of which are pivotally attached to the armatures of solenoids 170, 171, respectively. The solenoids 170, 171 are in an interlocked circuit whereby energization of one of them de-energizes the other. The energization of solenoid 170 rocks the deflector 165 to the position indicated in FIG. 7 to cause the outer file of carton blanks 20a to feed to the upper conveyor 80. Energization of the solenoid 171 rocks the deflectors 165 to the position shown in FIG. 1 whereby the file of carton blanks 20a is directed into the center conveyor.

Similar means are provided for directing the file of carton blanks 20c to the lower conveyor 75 which includes a series of deflectors 175, of which one is shown in FIGS. 1 and 7, cooperating with a fixed guide 176 and mounted on a rock shaft 177. Said shaft carries a lever 178 pivotally connected to the armatures of solenoids 180, 181 which are similarly connected in an interlocking circuit for mutually exclusive actuation. Energization of solenoid 180 rocks deflectors 175 to the position shown in FIG. 7 wherein the file of carton blanks 20c is directed to the input point of the lower conveyor 75 while energization of solenoid 181 directs the carton blanks 20c through the center conveyor. Each of the solenoids 170, 171, 180, 181 is actuated under control of a respective switch in the control circuit, not shown, and which includes locking relays for holding respective solenoid energized until de-energized by the energization of the other solenoid in the interlocked circuits. Said circuit also includes synchronizing means for preventing energization of the respective solenoid by actuation of its control button until such time as a carton blank has cleared the associated deflectors 165 or 175, as the case may be, and at a time prior to the leading edge of the next carton blank reaching said deflectors. This synchronizing means, as shown in FIG. 6, includes a timing cam 181 mounted on a driven shaft 182 of the cutting press 16, the high dwell of the cam actuating a micro-switch 183 carried by an arm 184 pivoted to the frame of the press at 185. The other end of arm 184 is attached to the armature 186 of a control solenoid 187. The solenoid 187 is in a circuit arrangement wherein it is energized momentarily upon actuation of any one of the control push-buttons so as to bring the micro-switch 183, by rocking of arm 184, under the influence of the timing cam 181. The micro-switch 183 is in the energizing circuit to control relays which when energized complete circuits to the deflector actuating solenoids 170, 171, 180, 181. Said control relays, upon energization, also open the circuit to the control solenoid 187 so as to prevent repeated and idle operation of the micro-switch 183 by the timing cam 181.

From the foregoing, it will be apparent that the apparatus operates in an effective manner to collate or merge individual carton blanks being fed in a plurality of separate files, the apparatus operating to first divert the respective files of blanks into separate feeding planes and then cause the direction of feed in certain of the feeding planes to be altered so that ultimately the blanks in all planes converge into register with one another and also are directed so as to occupy a common feeding plane with the result that as the blanks are discharged from the apparatus, the carton blanks which were initially in separate files are rearranged so as to lie in superposed relation to one another. This result is achieved by a proper selection of various size drive pulleys which drive the upper and lower conveyors enough faster than the center conveyor to compensate for the longer feed path defined thereby. Furthermore, in the event that one or the other of the files of carton blanks should contain blanks with blemishes or other defects, the respective file may be segregated rather than merged or collated so as to be discharged from the apparatus in laterally offset relation to the merged file, thereby avoiding the necessity for culling the merged file for the purpose of rejecting the blanks containing the blemishes.

While there has been shown and described what is considered to be a preferred embodiment of the invention, it will of course be apparent that changes in form could be made therein without departing from the spirit of the invention. It is, therefore, intended that the invention be not limited to the exact form herein shown and described nor to anything less than the whole of the invention herein disclosed and as hereinafter claimed.

What we claim and desire to secure by Letters Patent is:

1. An apparatus for collating sheetlike articles being fed seriatim in a plurality of separate files disposed in coplanar and parallel relation to one another comprising, a first conveyor means for advancing the articles of one file within the common plane and along a predetermined directional axis, a second conveyor means for feeding the articles of another file within another plane and along a directional axis converging with said predetermined directional axis, and means disposed at the input and output ends, respectively, of said second conveyor means for diverting the articles of said another file from said common plane to said another plane and from said another plane to said common plane, respectively, whereby the articles within the first and second files become merged at a location of convergence of the respective directional axis for delivery in superposed relation to one another from the apparatus.

2. An apparatus for collating sheetlike articles being fed seriatim in a plurality of separate files disposed in coplanar and parallel relation to one another comprising, a first conveyor means for advancing the articles of one file within the common plane and along a predetermined directional axis, a second conveyor means for feeding the articles of another file within another plane and along a directional axis converging with said predetermined directional axis, means disposed at the input end of said second conveyor means for diverting the articles of said another file from said common plane to said another plane, and means disposed at the output end of said second conveyor means for diverting the articles of said another file from said another plane back to said common plane, whereby the articles within said first and second files are merged at a location of convergence of the respective directional axes for delivery in superposed relation to one another from the apparatus.

3. The invention according to claim 2 wherein said first mentioned diverting means comprise deflector members controllable to guide the articles of said another file to the input of said second conveyor means or to guide the articles of said another file to the input of said first conveyor means for feed along a directional axis parallel to that of said one file.

4. The invention according to claim 1 wherein said second conveyor means is mounted for adjustment relative to the first conveyor means for varying the angle of convergence between the directional axes of said first and second conveyor means.

5. An apparatus for collating sheetlike articles being fed seriatim in a plurality of separable files disposed in coplanar and parallel relation to one another comprising, a first conveyor means for advancing the articles of one file within the common plane and along a predetermined directional axis, a second conveyor means for feeding the articles of a second file within a second plane and along a directional axis converging with the said predetermined axis, a third conveyor means for feeding the articles of a third file within a third plane and along a directional axis intersecting the location of convergence between that of said first and second conveyor, and means disposed at the input and output ends, respectively, of said second and third conveyor means for diverting the articles of said second and third files from said common plane to said second and third planes, respectively, and from said second and third planes, respectively, to said common plane, whereby the articles within said first, second and third files become merged at the location of convergence of their respective directional axes for delivery in superposed relation to one another from the apparatus.

6. The invention according to claim 5 wherein said second and third planes lie on opposite sides of said common plane and in parallel relation thereto.

7. The invention according to claim 5 wherein the diverting means disposed at the input ends of said second and third conveyor means comprise deflector members controllable to guide the respective files to the input of said second and third conveyor means, respectively, or to guide said second and third files, respectively, to the input of said first conveyor means for advance along directional axes parallel to that of said first conveyor means.

8. The invention according to claim 5 wherein each of said second and third conveyor means are adjustably mounted relative to said first conveyor means for varying the angles of convergence between the directional axes thereof with that of said first conveyor means.

9. An apparatus for collating sheetlike articles being fed seriatim in a plurality of separate files disposed in coplanar and parallel relation to one another comprising, a first conveyor means for advancing the articles of one file within the common plane and along a predetermined directional axis, a second conveyor means for feeding the articles of another file within another plane and along a directional axis converging with said predetermined directional axis, means disposed at the input and output ends, respectively, of said second conveyor means for diverting the articles of said another file from said common plane to said another plane and from said another plane to said common plane, respectively, and adjustable mounting means for varying the angle of convergence between the directional axis of said first and second conveyor means, said adjustable means including a fixed member extending longitudinally along a direction perpendicular to the directional axis of said first conveyor means, a carriage member positionable along the length of said fixed member, and a support member secured to said second conveyor means and pivotally joined to said carriage member for rotative adjustment relative thereto in accordance with the longitudinal adjustment of said carriage member relative to said fixed member.

10. The invention according to claim 9 wherein said second conveyor means includes an endless feed belt disposed for engagement with the articles of said another file.

11. The invention according to claim 10 wherein said second conveyor means is driven by an endless drive belt disposed along the pivotal axis between said support member and said carriage member.

12. The invention according to claim 11 wherein said endless drive belt is driven from a pulley adjustably poistionable along an axis parallel to the longitudinal axis of said fixed member.

13. An apparatus for collating sheetlike articles being fed seriatim in a plurality of separate files disposed in coplanar relationship to one another comprising, a first conveyor means for advancing the articles of a first file within the common plane and along a predetermined directional axis, a second conveyor means for feeding the articles of a second file within a second plane along a directional axis converging with said predetermined directional axis, means disposed at the input and output ends, respectively, of said second conveyor means for diverting the articles of said second file from said common plane to the input end of said second conveyor means and diverting the articles from said second conveyor means to said common plane at a location of convergence of the respective directional axes, said second conveyor means including an endless feed member engaging with the articles being conveyed, means adjustably supporting the input end of said second conveyor means for varying the directional axis thereof, said adjustable means including a fixed member extending longitudinally along an axis perpendicular to the directional axis of said first conveyor means, a carriage member adjustably positionable along said fixed member, and a support member secured to the said second conveyor means and pivotally joined to said carriage member for rotative adjustment relative thereto in accordance with the longitudinal adjustment of said carriage member relative to said fixed member, an endless drive member for said second conveyor means disposed along the pivotal axis between said support member and said carriage member, and a drive pulley for said endless drive member adjustably positionable along an axis parallel to the longitudinal axis of said fixed member in accordance with the adjustable positioning of said carriage member relative to said fixed member.

14. An apparatus for collating sheetlike articles being fed seriatim in a plurality of separate files disposed in coplanar relation to one another comprising, a first conveyor means for advancing the articles of a first file within the common plane and along a predetermined directional axis, a second conveyor means for feeding the articles of a second file within a second plane and along a directional axis converging with said predetermined directional axis, a third conveyor means for feeding the articles of a third file within a third plane and along a directional axis intersecting the location of convergence between the directional axes of said first and second conveyor means, means disposed at the input and output ends, respectively, of said second and third conveyor means for diverting the articles of said second and third files from said common plane to the input ends of said second and third conveyor means, respectively, and diverting the articles from said second and third conveyor means to said common plane at the location of convergence of the respective directional axes, each of said second and third conveyor means including endless feed members engaging with the respective articles being conveyed, means adjustably supporting the input ends of said second and third conveyor means, respectively, for varying the directional axis thereof, each said supporting means including a fixed member extending longitudinally along an axis perpendicular to the directional axis of said first conveyor means, a carriage member adjustably positionable along each said fixed member, and a support member secured to the respective conveyor means and pivotally joined to the associated carriage member for rotative adjustment relative thereto in accordance with the longitudinal adjustment of said carriage member relative to said fixed member, an endless drive member for each of said second and third conveyor means each being disposed along the pivotal axis between the associated support member and carriage member, and a drive pulley for each endless drive member adjustably positionable along an axis parallel to the longitudinal axis of the associated fixed member in accordance with the adjustable positioning of the respective carriage member relative to said associated fixed member.

15. An apparatus for collating sheetlike articles being fed seriatim in a plurality of separate files disposed in coplanar and parallel relation to one another comprising, a first conveyor means for advancing the articles of one file within the common plane and along a predetermined directional axis, a second conveyor means for feeding the articles of another file within another plane and along a directional axis converging with said predetermined axis, means disposed at the output end of said second conveyor means for diverting the articles from said second conveyor means into the common plane, deflector means disposed at the input end of said second conveyor means for guiding said another file into said second conveyor means or guiding said another file into said first conveyor means for advance along a directional axis parallel to that of said first file, and means for controlling the operation of said deflector means, said controlling means including solenoids energizable to actuate said deflector means, and synchronizing means coordinated with the rate of feed of said articles for timing the energization of said solenoids to occur within intervals corresponding to the spacing between successive articles of said separate files.

16. The invention according to claim 15 wherein said synchronizing means includes a timing cam, a switch movable into and out of operative relation with said cam, and means for momentarily moving said switch into operative relation with said cam.

References Cited by the Examiner

UNITED STATES PATENTS

| | | | |
|---|---|---|---|
| 2,214,593 | 9/1940 | Mustin et al. | |
| 2,255,777 | 9/1941 | Jones | 270—58 |
| 2,288,755 | 7/1942 | Taggart | 270—58 |
| 2,308,804 | 1/1943 | Dager | 270—58 |
| 2,624,571 | 1/1953 | Dixon et al. | 270 |

EUGENE R. CAPOZIO, *Primary Examiner.*

NELSON M. ELLISON, *Assistant Examiner.*